United States Patent [19]

Kipp et al.

[11] Patent Number: 4,621,844
[45] Date of Patent: Nov. 11, 1986

[54] MEMORY METAL CONNECTOR

[75] Inventors: Robert M. Kipp; Ray R. Ayers, both of Houston, Tex.

[73] Assignee: Shell Oil Company, Houston, Tex.

[21] Appl. No.: 647,874

[22] Filed: Sep. 6, 1984

Related U.S. Application Data

[63] Continuation of Ser. No. 342,536, Jan. 25, 1982, abandoned.

[51] Int. Cl.⁴ .............................................. F16L 25/00
[52] U.S. Cl. ................................... 285/381; 285/417; 285/421
[58] Field of Search ............... 285/381, 369, 373, 417, 285/419, 323, 421, 372, 418, 342

[56] References Cited

U.S. PATENT DOCUMENTS

| | | | |
|---|---|---|---|
| 3,012,882 | 12/1961 | Muldawer et al. | 75/134 |
| 3,174,851 | 3/1965 | Buchler et al. | 75/170 |
| 3,351,463 | 11/1967 | Rozner et al. | 75/170 |
| 3,567,523 | 9/1968 | Jackson et al. | 148/11.5 |
| 3,753,700 | 8/1973 | Harrison et al. | 75/175.5 |
| 3,759,552 | 9/1973 | Levinsohn et al. | 285/175 |
| 3,783,037 | 11/1973 | Brook et al. | 148/11.5 R |
| 4,036,669 | 7/1977 | Brook et al. | 148/11.5 C |
| 4,050,720 | 9/1977 | Reneau | 285/323 X |
| 4,146,392 | 3/1979 | Brooks | 75/161 |
| 4,290,632 | 9/1981 | Manchester et al. | 285/323 |
| 4,314,718 | 2/1982 | Broyles et al. | 285/381 X |

FOREIGN PATENT DOCUMENTS 2306784 11/1976 France .................. 285/381

*Primary Examiner*—Dave W. Arola

[57] ABSTRACT

A connector for joining pipe ends is provided having heat expandable or contractable memory metal rods individually connecting a wedge ring and gripping wedge collet. Each ring and collet are in abutting relationship and coact to grip a pipe end.

23 Claims, 4 Drawing Figures

MEMORY METAL CONNECTOR

This is a continuation of application Ser. No. 342,536, filed Jan. 25, 1982 and now abandoned.

BACKGROUND OF THE INVENTION

In both offshore and onshore pipeline construction, the manually welded joint has become the standard by which other forms of pipeline joining are evaluated. Pipe joining, by whatever means, is more costly offshore where weather conditions can severely hinder pipeline construction operations. In recent years considerable improvements have been made in conventional pipelaying systems, and more specifically in pipe joining processes. Semi-automatic and then fully automatic welding systems have been developed, proven in the field, and now accepted offshore. However, the art remains deficient in the provision of mechanical connectors for diverless, subsea tie-ins of large diameter pipe in deep water. Accordingly, the present invention is directed to overcoming this deficiency of the art.

DISCUSSION OF THE PRIOR ART

Metallic compositions that are known to be capable of undergoing a reversible transformation from the austenitic state to the martensitic include unalloyed metals but this phenomenon is most commonly exhibited by alloys. Such alloys include, for example, those disclosed in U.S. Pat. Nos. 4,146,392; 4,036,669; 3,783,037; 3,759,552; 3,753,700; 3,567,523; 3,351,463; 3,174,851; 3,012,882; Belgian Pat. No. 703,649 and British Pat. Nos. 2,315,652; 1,315,653; 1,346,046 and 1,346,047. The disclosures of each of the aforementioned patents is incorporated herein by reference.

Such alloys are disclosed in NASA Publication SP110, "55-Nitonol-The Alloy With A Memory, etc." (U.S. Government Printing Office, Washington, D.C., 1972); N. Nakanishi et al, *Scripta Mettallurgica* 5, 433–440 (Pergamon Press, 1971); *Journal of the Institute of Metals*, 1966, Volume 94, "Study of Secondary Recrystalization and of the Effects of Thermal Cycling in Zone-Refined Zinc", A. Desalvo et al; *Machine Design*, Oct. 25, 1975, pages 113-117, "New Uses for Metals That Remember", David T. Curry; brochures by Raychem Corporation, "Join Copper to Aluminum Tubing the Easy Way", January 1980; "Betalloy, A Metal Alloy With A Memory", undated, and "Cryofit-The Better Way to Join Pipes", undated, the disclosures of which are likewise incorporated herein by reference.

SUMMARY OF THE INVENTION

The present invention provides a connector for joining pipe ends which includes a connector housing insertable over pipe ends, means within the housing operable to grip the pipe end, memory metal means engagable to operate the gripping means, and means for activating the memory metal means. Preferably, the connector employs a separate means for sealing the connector housing to the pipe end which is not directly associated with the gripping means. More preferably, the sealing means is at least one memory metal ring circumferentially attached inside the housing and contacting the pipe end.

In a preferred embodiment the gripping means is enforceable against the pipe end surface by a wedge loading ring which is drivable by the memory metal means. The connector can include several sets of two gripping means and two wedge loading rings connected by memory metal means. Alternatively, the connector can include several sets of two gripping means, two wedge loading rings and two memory metal rings, with each memory metal means connecting one gripping means and one wedge loading ring.

DESCRIPTION OF PREFERRED EMBODIMENTS

Both organic and metallic materials capable of being rendered heat recoverable are well known. An article made from such materials can be deformed from an original, heat-stable configuration to a second, heat-unstable configuration. The article is said to be heat recoverable for the reason that, upon the application of heat, it can be caused to revert from its heat-unstable configuration to its original, heat-stable configuration. Among metals, for example certain alloys of titanium and nickle, the ability to be rendered heat recoverable is a result of the fact that the metal undergoes a reversible transformation from an austenitic state to a martensitic state with changes in temperature. An article made from such a metal, for example, a hollow sleeve, is easily deformed from its original configuration to a new configuration when cooled below the temperature at which the metal is transformed from the austenitic state to the martensitic state. When an article thus deformed is cooled to the temperature at which the metal becomes martensitic, it can be easily expanded to a larger diameter, for example, by using a mandrel. If the expanded sleeve is subsequently allowed to warm to the temperature at which the metal reverts back to its austenitic state, the sleeve will revert to its original dimensions.

Figure 1:
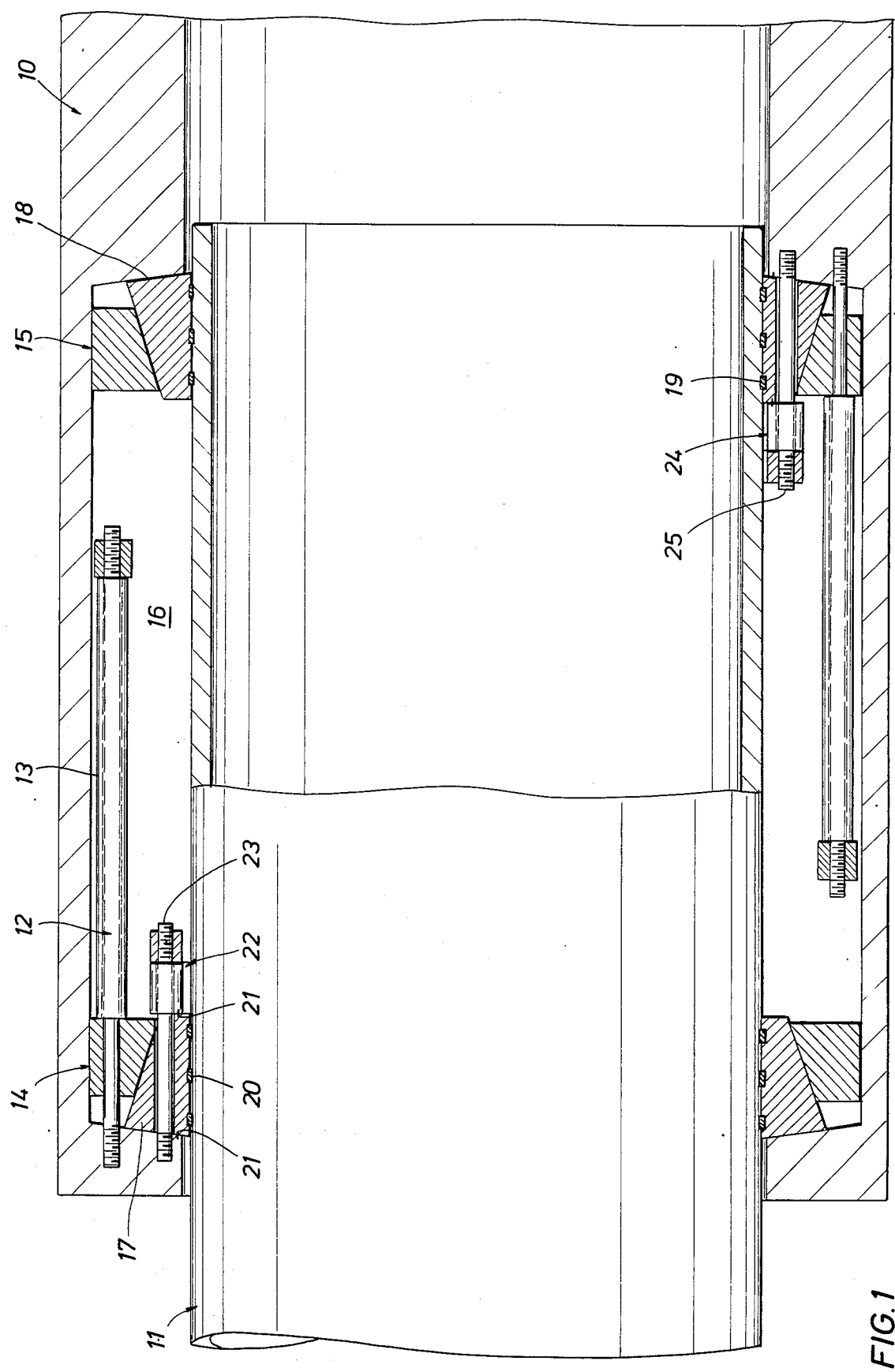
FIG. 1 discloses a pipe gripping mechanism using tension memory metal rods.

Referring now to FIG. 1 of the drawings there is shown a pipe-grabbing mechanism using contraction memory metal rods. Inside a connector housing 10 disposed about pipe 11, for example a pipe of 24-inch diameter and 0.8-inch walls, is a memory metal rod 12 which in turn is inside a steel tube 13. Rod 12 is used to drive wedge ring 14 by means of tube 13, while another wedge ring 15 is driven by a separate memory metal rod, not shown, at the opposite end of space 16 inside connector housing 10. Gripping wedge collets 17 and 18, having penetration ridges 19 and 20 for gripping pipe 11, are originally held by shear pins 21. Rings 22 and 24 are utilized to hold axial preloads on the gripping wedges 17 and 19 while tensile memory metal rods 23 and 25 are operative to apply a preload thereto.

Figure 2:
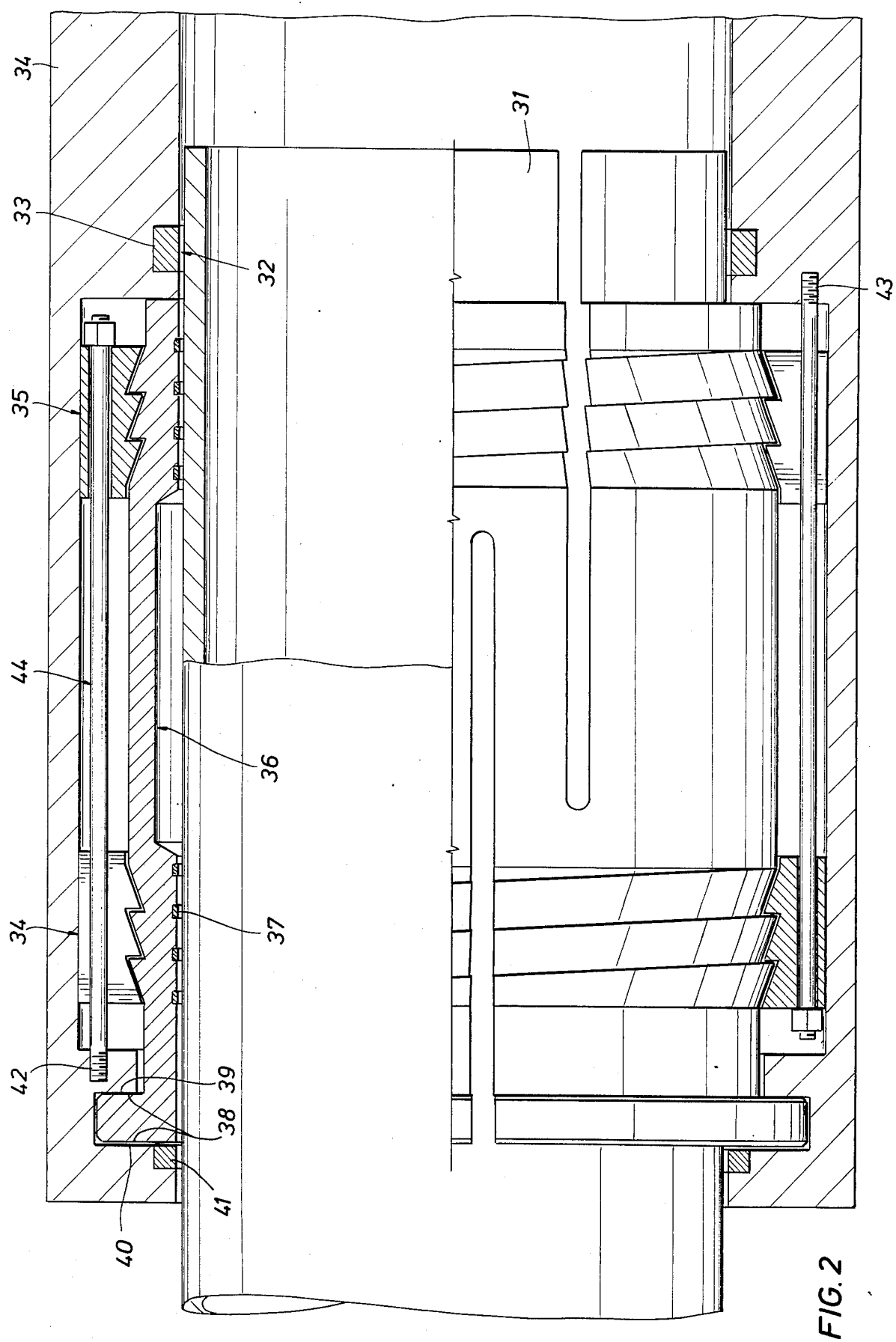
FIG. 2 pertains to a pipe gripping mechanism driven by overlapping memory metal tension rods.

Referring now to FIG. 2 of the drawings, there is shown a pipe gripping mechanism driven by overlapping memory metal tensile rods. A connector housing 30 is disposed about a pipe end 31. A memory metal primary seal ring 32 is inserted inside a tapered notch 33 in the housing which is closely adjacent to the pipe end. Such memory metal seal rings may be coated with a combination anti-corrosive cover and soft-sealing medium. Inside housing 30 are memory metal drive rods 44

(for example, 48 rods which are each 1.25-inch diameter). The memory metal rods are connected to wedge loading rings 34 and 35 having serrated bottoms which are in contact with a grab wedge collet assembly 36. As in the embodiment of FIG. 1, this assembly has pipe gripping surfaces 37 at either end. The grab wedge collet assembly terminates at one end in a member 38 which transfers axial loads across either face 39 or 40. This member 38 also abuts another memory metal sealing ring 41. The memory metal drive rods 44 are held at either end thereof at anchor points 42 and 43.

Figure 3:
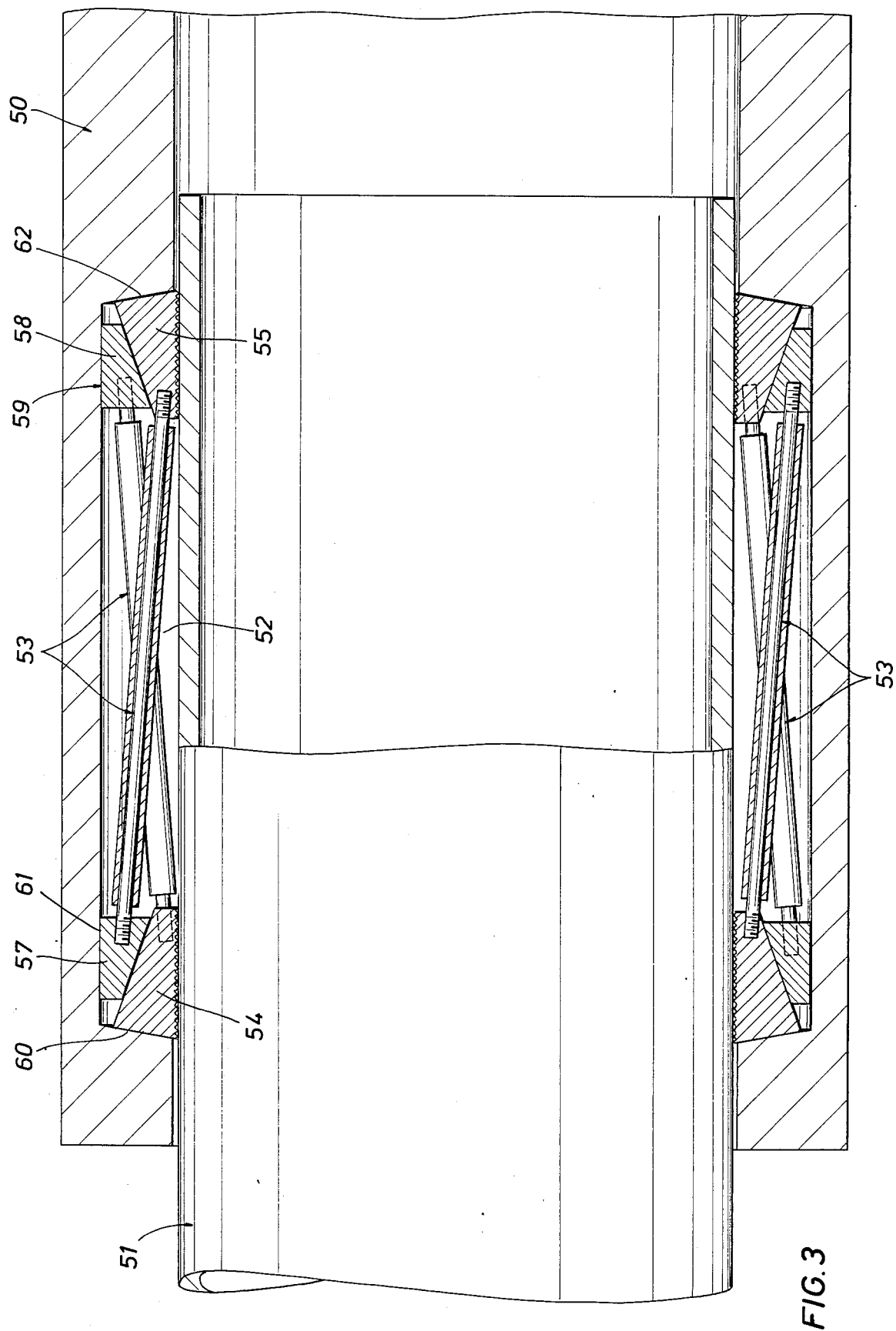
FIG. 3 depicts a pipe gripping mechanism using a basket weave of memory metal rods.

FIG. 3 of the drawings shows still another embodiment of the invention which employs a basketweave assembly of compressive memory metal rods. Outer connector housing 50 is disposed about a pipe end 51. Within space 52 of the connector housing are memory metal rods 53. Grab wedge collets 54 and 55 having tooth gripping surfaces 56 are at either end of space 52. Memory metal rods 53 each connect a wedge ring 57 or 58 to a grab wedge collet. The surfaces 59 and 61 of the wedge rings 58 and 57, respectively, can be lubricated, and/or anti-backout teeth can be used on this surface. The surfaces 60 and 62 of the grab wedge collets 54 and 55 may be tapered to prevent lockup against initial radial motion of the grab wedge collets 54 and 55. Sleeves 63 resist buckling of the memory metal rods.

Figure 4:
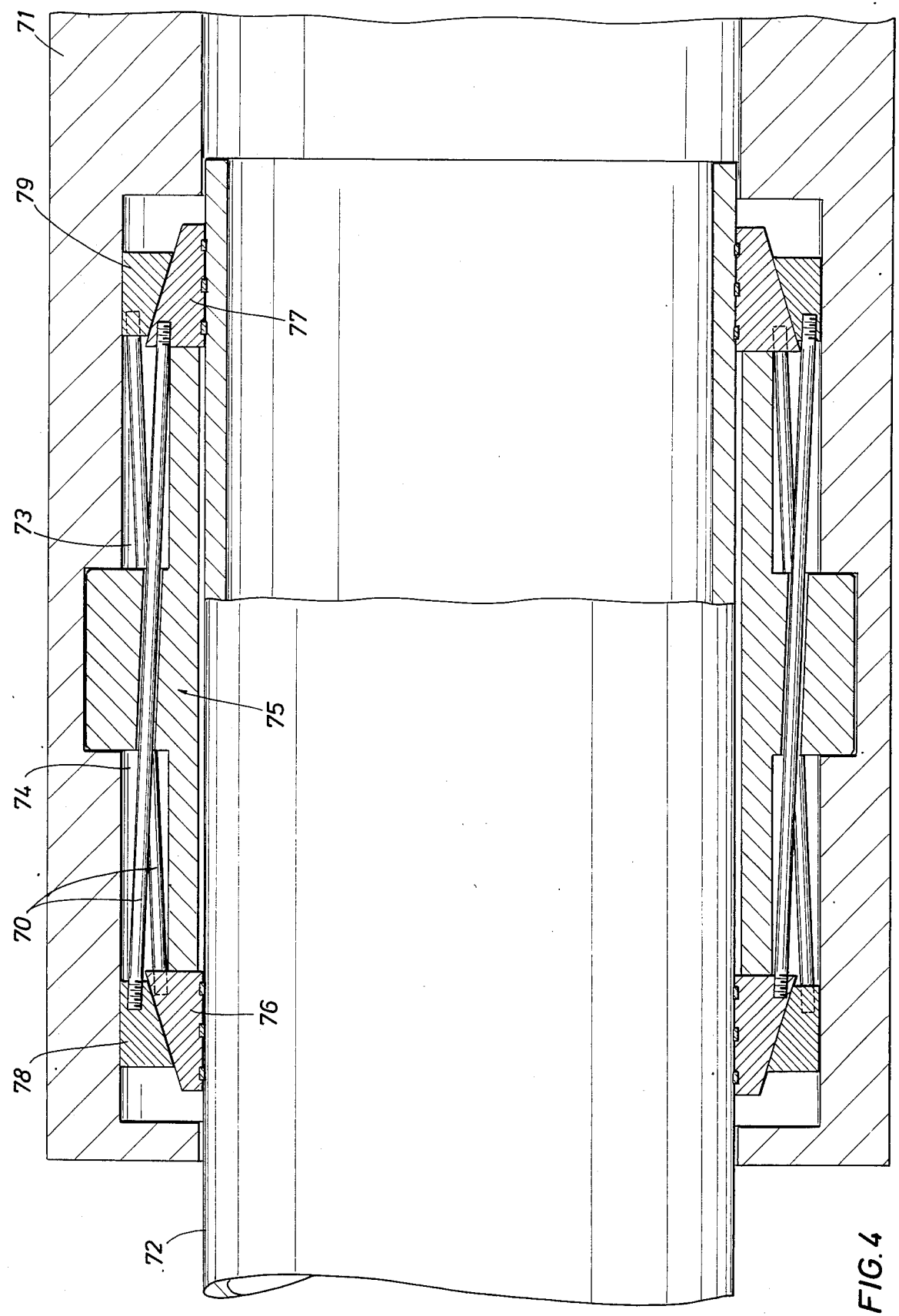
FIG. 4 discloses the embodiment of FIG. 3 with the addition of a load transfer sleeve.

An embodiment related to the embodiment of FIG. 3 is shown in FIG. 4. This embodiment uses memory metal rods 70 which contract as compared to the memory metal rods 53 of FIG. 3 which expand. Connector housing 71 encloses a pipe end 72. Inside the connector housing 71 is provided spaces 73 and 74 on both sides of a load transfer sleeve 75. Alternatively, the load transfer sleeve may utilize several pieces (not shown). The memory metal rod 70 passes through spaces 73 and 74 and through load transfer sleeve 75 and connects grab wedge collets 76 and 77 with wedge rings 78 and 79. Each memory metal rod therefore connects one grab wedge collet to one wedge ring. As in the embodiments of FIGS. 1 and 2, the grab wedge collet has ridges which are adapted to bite into the pipe metal surface.

Various features shown in each of the above embodiments may be exchanged with or substituted for similar or different features of other embodiments; thus, ridges 19 in FIG. 1 may be used with any of the embodiments. In addition, the memory metal seals 32 and 41 of FIG. 2 may be used in the other embodiments. It will be apparent to those skilled in the art that other combinations and modifications of the present invention can be made without departing from the spirit and scope of the invention as above disclosed.

What is claimed is:

1. Apparatus for gripping a pipe comprising:
a housing which encloses at least part of the pipe and defines an elongated space between the housing and the pipe, said elongated space containing at least two wedges, one wedge contacting the housing and the other wedge contacting the pipe, each wedge having a slanting surface and a slanting surface of the one wedge being in contact with an oppositely slanting surface of the other wedge; and
memory metal means functional upon activation to apply a lateral force within the elongated space between the housing and the pipe against one of the two wedges to force the slanting surface of one of the two wedges against the oppositely slanting surface of the other of the two wedges, the opposite sides of the two wedges from the respective slanting surfaces being functional to press respectively against the housing and the pipe, thereby securing the housing to the pipe.

2. The apparatus of claim 1 wherein the memory metal means contracts upon activation.

3. The apparatus of claim 2 wherein the memory metal means is a first rod which is secured to one end of the housing and to the first wedge, which is spaced from the end of the housing to which the first rod is secured.

4. The apparatus of claim 3 wherein the first rod slidably extends through the first wedge and through a sleeve which abuts the first wedge, and the first rod is secured to the opposite end of the sleeve from the first wedge.

5. The apparatus of claim 3 wherein the memory metal means includes a second rod which is attached to the same end of the housing as the first rod and which is secured to the second wedge which is adjacent to the pipe.

6. The apparatus of claim 5 wherein the second rod slidably extends through the second wedge and through a sleeve which abuts the second wedge which in turn abuts the end of the housing to which the second rod is secured, and the second rod is secured to the opposite end of the sleeve from the second wedge.

7. The apparatus of claim 6 wherein the second wedge has a non-slanting surface and non-slanting surface of the second wedge has penetration ridges for gripping the pipe.

8. The apparatus of claim 5 wherein duplicate memory metal means and wedges are secured to the opposite end of the housing.

9. The apparatus of claim 2 wherein the slanting surfaces of the wedges are serrated.

10. The apparatus of claim 9 wherein the memory metal means is a first rod which is secured to one end of the housing and to a first serrated wedge at the opposite end of the housing.

11. The apparatus of claim 10 wherein the second serrated wedge is adjacent to the pipe and is connected to a third serrated wedge at the opposite end of the housing.

12. The apparatus of claim 11 wherein the first rod extends through a fourth serrated wedge which is adjacent to the third serrated wedge.

13. The apparatus of claim 12 wherein a second rod is secured to the opposite end of the housing from the first rod, extends through the first serrated wedge and is secured to the fourth serrated wedge.

14. The apparatus of claim 13 wherein the second and third wedges have a non-slanting surface and the non-slanting surfaces of the second and third serrated wedges have penetration ridges for gripping the pipe.

15. The apparatus of claim 11 wherein the third serrated wedge is secured to the same end of ther housing as the first rod.

16. The apparatus of claim 2 wherein the first and second wedges are adjacent one end of the housing and similar third and fourth wedges are adjacent the opposite end of the housing and a first memory metal rod is secured at one end to the first wedge, which is adjacent to the side of the housing and spaced from the end of the housing, and is secured at the other end to the third wedge which is adjacent to the pipe and abutting the end of the housing.

17. The apparatus of claim 16 wherein a second memory metal rod is secured at one end to the second wedge, which is adjacent to the pipe and abutting the end of the housing, and is secured at the other end to the fourth wedge which is adjacent to the side of the housing and spaced from the end of the housing.

18. The apparatus of claim 17 wherein the wedges adjacent to the pipe are held apart by a load transfer sleeve.

19. The apparatus of claim 18 wherein the memory metal rods are at least partly enclosed by the load transfer sleeve.

20. The apparatus of claim 1 wherein the memory metal means expands upon activation.

21. The apparatus of claim 20 wherein the first and second wedges are adjacent one end of the housing and similar third and fourth wedges are adjacent the opposite end of the housing and a first memory metal rod is secured at one end to the first wedge, which is adjacent to the side of the housing and spaced from the end of the housing, and is secured at the other end to the third wedge which is adjacent to the pipe and abutting the end of the housing.

22. The apparatus of claim 21 wherein the second memory metal rod is secured at one end to the second wedge, which is adjacent to the pipe and abutting the end of the housing, and is secured at the other end to the fourth wedge which is adjacent to the side of the housing and spaced from the end of the housing.

23. The apparatus of claim 22 wherein sleeves enclose part of the memory metal rods between the wedges.

* * * * *